United States Patent [19]

Motsinger

[11] 4,001,782
[45] Jan. 4, 1977

[54] COMBINED ENCODER AND DECODER CIRCUIT

[75] Inventor: James Valery Motsinger, Austin, Tex.

[73] Assignee: Motorola, Inc., Schaumburg, Ill.

[22] Filed: Nov. 6, 1975

[21] Appl. No.: 629,336

[52] U.S. Cl. .................. 340/171 R; 179/84 VF; 331/11; 331/60; 331/156; 340/311; 325/22
[51] Int. Cl.² ............... H04Q 9/08; H03B 3/04; H03B 5/30; H04M 11/02
[58] Field of Search ........... 340/171 R, 311, 312, 340/147 PC; 325/19; 179/84 VF; 328/31, 168, 170, 175; 307/264; 331/11, 12, 58, 60, 61, 109, 182, 116, 156; 330/85, 86, 104, 141

[56] References Cited
UNITED STATES PATENTS

| | | | |
|---|---|---|---|
| 3,584,302 | 6/1971 | Lundgren | 325/22 |
| 3,879,709 | 4/1975 | Yukawa | 340/171 A |
| 3,952,261 | 4/1976 | Hara et al. | 331/12 |

*Primary Examiner*—Donald J. Yusko
*Attorney, Agent, or Firm*—James W. Gillman; Donald B. Southard; Phillip H. Melamed

[57] ABSTRACT

A combined encoder and decoder circuit which uses a single frequency selective resonant reed in a closed loop oscillator configuraion permitting simultaneous encoder and decoder operation. A closed loop oscillator has a resonant reed connected in series between an input and output terminal and produces a signal at the resonant frequency of the reed. Positive signal feedback from the output to input terminal is provided by an amplifier, operated between saturation and cut-off, and a controllable attenuator. A level detector and the attenuator effectively form a limited range negative feedback loop which effectively maintains the signal magnitude at the output terminal at a substantially constant level. A decode detector monitors the signal level at the output terminal and produces a decode signal when an input signal, having the same frequency as the resonant frequency of the reed, has a magnitude which is so large that the negative feedback circuitry cannot maintain a constant signal level at the oscillator output terminal. The output of the positive feedback amplifier always provides a constant amplitude output signal which can be used for encoding purposes. Because of the use of both positive and negative feedback, the circuit as a fast decoding response to large input signals while preventing responses to small amplitude input signals.

11 Claims, 5 Drawing Figures

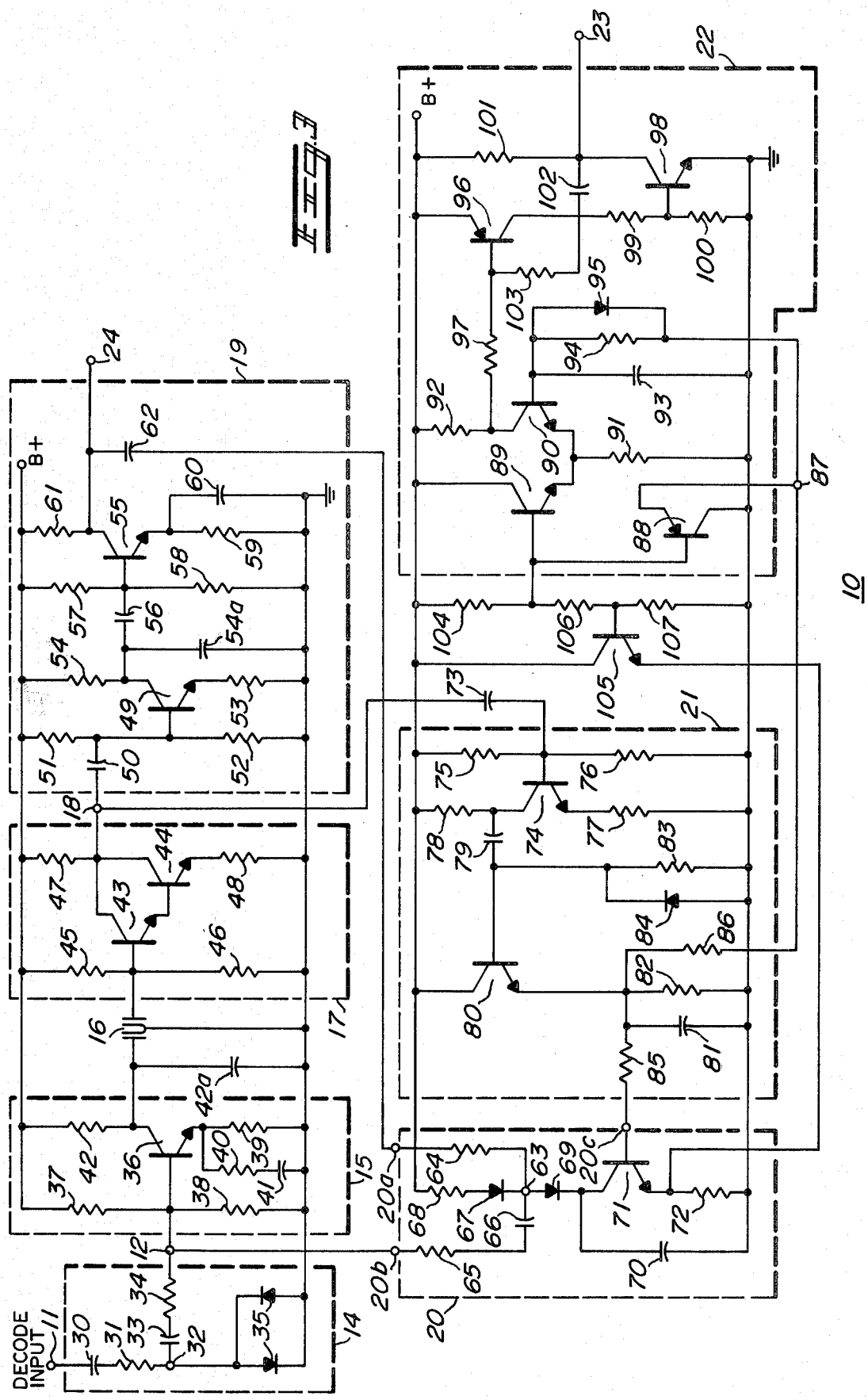

COMBINED ENCODER AND DECODER CIRCUIT

BACKGROUND OF THE INVENTION

The invention relates generally to combined encoder/decoder circuit arrangements and more particularly, to an improved circuit arrangement of this type wherein a frequency selective resonant reed is used in an oscillator circuit having both positive and negative feedback.

In many electronic applications it is necessary to identify when a received signal has a tone which exactly corresponds to a precise predetermined frequency. Such signal identification is commonly referred to as decoding. One typical example of a coding system application is a radio personal paging system in which a tone, or sequence of tones, is used to alert one of many paging receivers.

The identification and the generation of precise frequency tones may be effected by using a resonant reed which presents a low impedance to signals having frequencies that substantially correspond to the resonant frequency of the reed. A high impedance is presented to signals having other frequencies. Normally a single resonant reed is used in a decode circuit to identify a specific tone and an additional separate resonant reed is used in an oscillator circuit to generate a specific tone which is used for encoding a signal.

Because resonant reeds are costly, some prior systems use a single reed in a combined encoder and decoder circuit in which the circuit is selectively switched between either an encoding or decoding mode of operation. In such circuits, an encoding signal is produced by an oscillator which includes the resonant reed and the operation of the oscillator is terminated when a decoding function is desired. Such systems are not capable of providing simultaneous encode and decode operation and require complex switching circuits.

The frequency selective element (resonant reed) normally has a very slow initial response time and a slow turn off time. This is because the frequency responsive element is a high Q circuit which stores energy. Thus the element has a slow start up time, required to build up the necessary stored energy, and a slow turn off time, required to dissipate the stored energy. These properties of the reed create many design problems for the prior art selectively switched combined encoder and decoder circuit. The problems result because of the need for an instantaneous encoding signal when encoding operation is desired and the need for a decoder circuit which rapidly and properly responds to a desired input signal.

The decode response times of the prior art combined encoder/decoders are primarily determined by the Q of the frequency responsive element. Since high Q elements are required for efficient frequency selection, prior art circuits have had slow initial response times. Additionally, the slow turn off time of the resonant reed has resulted in prior circuits being especially susceptible to high energy pulses creating a false tone detection. Such "falsing" is typically caused by a high energy pulse shocking the resonant frequency element into a ringing mode which thereby creates a false indication of a code tone.

SUMMARY OF THE INVENTION

Accordingly, an object of the present invention is to provide an improved combination encoder/decoder circuit arrangement for overcoming the aforementioned deficiencies.

A more particular object of the present invention is to provide an improved encoder/decoder circuit which uses a single frequency selective element and provides for simultaneous encoding and decoding operation.

Another object of the invention is to provide an improved decoder circuit adaptable for use in a combined encoder/decoder circuit, the decoder having a fast response time and including a frequency selective element in a closed loop oscillator having both positive and negative feedback.

In practicing the invention, an improved encoder/decoder circuit is provided especially suited for use in two-way radio communication applications with tone coding. The circuit comprises a closed loop oscillator having an input terminal adaptable for receiving external input signals, an output terminal, and a frequency selective device coupled between the input and output terminals. The oscillator uses positive signal feedback from the output terminal to the input terminal to create an oscillation signal at the predetermined frequency and the frequency selective device passes only signals from the input terminal to the output terminal which have frequencies which substantially correspond to the predetermined frequency.

Negative feedback compensation circuitry is coupled to the oscillator for monitoring and maintaining a signal having a substantially constant magnitude level at the output terminal for input signals received by the input terminal which have a frequency corresponding to the predetermined frequency and magnitudes below the predetermined value. The negative feedback circuit allows the oscillator to increase the magnitude of the signal at the output terminal above the constant magnitude level in response to input signals received by the input terminal which have a frequency corresponding to the predetermined frequency and a magnitude equal to and above the predetermined value. The circuit also includes a decode detector coupled to the output terminal for producing a decode signal in response to the signal magnitude at the output terminal exceeding the constant magnitude level by a predetermined amount. An encoder output amplifier is coupled to the output terminal for amplifying the signal at the output terminal and thereby continuously providing a signal adaptable for encoding purposes.

The terms "signal magnitude" and "magnitude level", as used herein, refer to any quantity which provides a measure of the amplitude of a signal. The terms therefore include the rms (root-mean-square) and maximum peak values of a signal.

The oscillator circuit keeps the frequency selective device energized by an oscillating signal to provide a decoder with a fast response time to a proper input signal while the negative feedback circuitry prevents the improved encoder/decoder from responding unless the input signal has a magnitude above the predetermined value.

In one embodiment of the present invention, a resonant reed is used in a positive feedback oscillator in which the signal magnitude at an internal terminal is kept at a constant level by negative feedback circuitry controlling the amount of positive signal feedback. When a sufficiently large input signal having a specific frequency is applied to the oscillator circuit, the negative feedback circuit can no longer maintain a signal having a constant magnitude at the internal terminal by decreasing the positive feedback. A decode detector produces a decode signal when the magnitude of the signal at this internal terminal exceeds a predetermined level and an amplifier with its input connected to the oscillator output terminal continuously provides a signal for encoding purposes.

BRIEF DESCRIPTION OF THE DRAWINGS

For a more complete understanding of the invention, reference should be made to the drawings, in which:

FIG. 3 is a schematic diagram of the encoder and decoder circuit shown in FIG. 1.

DESCRIPTION OF THE PREFERRED EMBODIMENT

Figure 1:
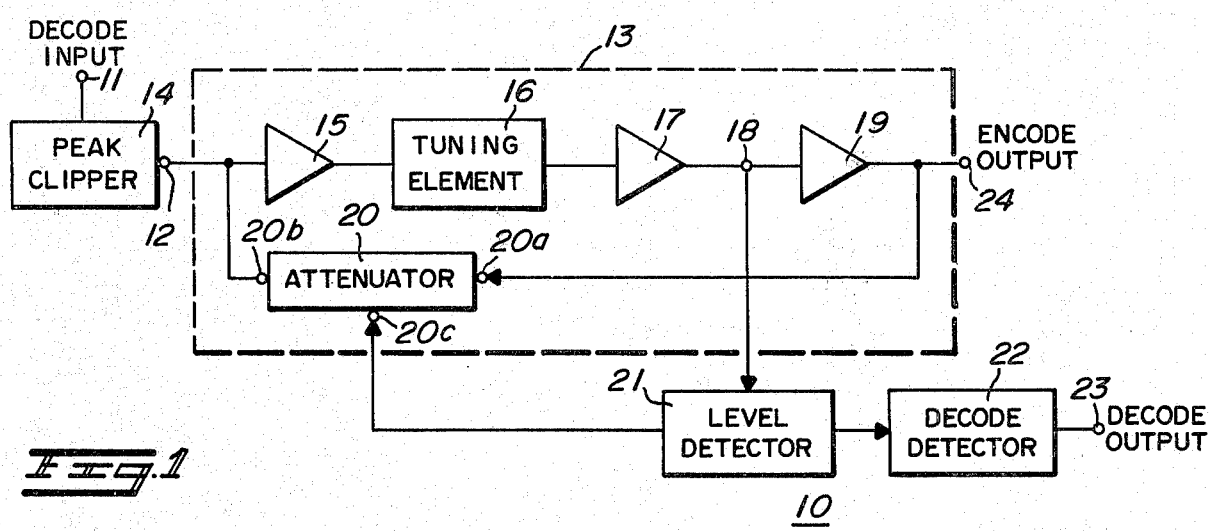
FIG. 1 is a block diagram of an improved encoder and decoder circuit.

FIG. 1 ilustrates a combined encoder and decoder circuit 10 which is used for simultanteously producing output signals and detecting input signals having a precise predetermined frequency. An input signal to be decoded is provided at a decode input terminal 11. The input signal is coupled to an input terminal 12 of a closed loop oscillator 13 (shown dashed) through a peak clipper circuit 14 which prevents large amplitude signal spikes from reaching the input terminal 12. The oscillator 13 comprises an amplifier 15, a frequency selective tuning element 16 and an amplifier 17 all connected in series between the input terminal 12 and an internal oscillator output terminal 18. The amplifiers 15 and 17 provide series cascade amplification of signals present at the terminal 12 and the tuning element 16, which in a preferred embodiment of the invention is a resonant reed, passes only those amplified signals from amplifier 15 to amplifier 17 which have frequencies that substantially correspond to the predetermined resonant frequency of the tuning element 16. An amplifier 19 amplifies the signals at the terminal 18 and supplies these amplified signals to the input terminal 12 through a controllable attenuator 20. The attenuator has an input terminal 20a for receiving the amplified signals from the amplifier 19, an output terminal 20b directly connected to the terminal 12, and a control terminal 20c. The amplifier 19 and the attenuator 20 provide a positive signal feedback for the oscillator 13 which comprises the elements 12 through 20.

The oscillator output terminal 18 is coupled to a level detector 21 which provides a control signal to the terminal 20c of the attenuator 20 and a level indicating signal to a decode detector 22. The decode detector compares the level indicating signal with a reference voltage and produces a decode signal at an output terminal 23 whenever the level detector 21 indicates that the signal magnitude level at the terminal 18 has been substantially increased for at least a predetermined duration of time.

The level detector 21 monitors the signal magnitude at the terminal 18 and produces a DC control voltage which varies the attenuation of the attenuator 20 so that the amount of positive signal feedback is varied inversely with respect to the magnitude of the signal at terminal 18. Thus the level detector 21 and the controllable attenuator 20 effectively form part of a negative feedback compensation loop for the oscillator 13. This negative feedback loop maintains the magnitude of the signal at terminal 18 at a substantially constant level until a large signal having a frequency corresponding to the resonant frequency of the tuning element 16 is received at the terminal 12 from the decode input terminal 11. When this occurs, the level detector 21 and attenuator 20 will be unable to compensate for this large input signal by decreasing the amount of positive signal feedback. Therefore the magnitude of the signal at the output terminal 18 will increase. The level detector 21 senses this increase in signal level and produces a corresponding increase in a level indicating signal which causes the decode detector 22 to generate a decode signal at the output terminal 23.

The amplifiers 15 and 17 are operated in a linear, nonlimiting mode of operation and are maintained in this mode by the negative feedback circuitry which includes the attenuator 20 and the level detector 21. The amplifier 19 is operated in a limiting, saturation to cut-off mode and therefore provides the attenuator 20 with a constant amplitude input signal at the input terminal 20a. The constant amplitude output of the amplifier 19 is coupled to an encoder output terminal 24 at which a constant amplitude signal having a frequency equal to the precise resonant frequency of the tuning element 16 is always provided.

The advantages and operation of the encoder and decoder circuit 10 will now be discussed with specific reference to the waveforms illustrated in FIGS. 2A-2C. In all of these FIGS. the vertical scales represent the signal magnitude at the terminal 18. The horizontal scales in FIGS. 2A and 2B represent time and the horizontal scale in FIG. 2C represents the decode input signal magnitude at the input terminal 12.

Figure 2A:
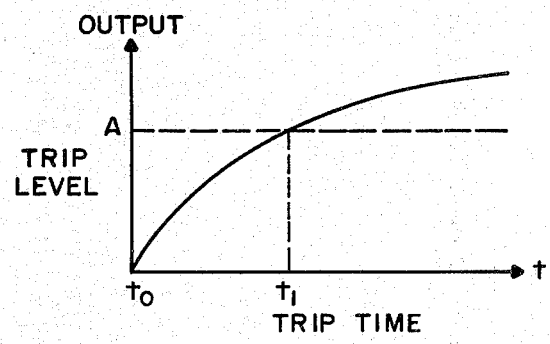
FIGS. 2A, 2B, and 2C are graphs illustrating waveforms associated with the circuit shown in FIG. 1.

FIG. 2A is a graph illustrating the response of a typical prior art decoder to an input signal commencing at a time $t_o$ and having a large magnitude and a frequency corresponding to the resonant frequency of the tuning element of the decoder. Since the tuning element is a high Q device because precise frequency resolution is required, a significant duration of time elapses between the commencement of the large magnitude input signal ($t_o$) and a later time $t_1$ when the output has reached a trip level A which indicates that a proper input signal has been received. The curve has the general shape of a capacitor charging curve which is due to the fact that the frequency responsive tuning element has a high Q and energy storage properties. The response shown in FIG. 2A would be the response of the decoder circuit 10 if either the amplifier 19 or the attenuator 20 were replaced by an open circuit.

Figure 2B:
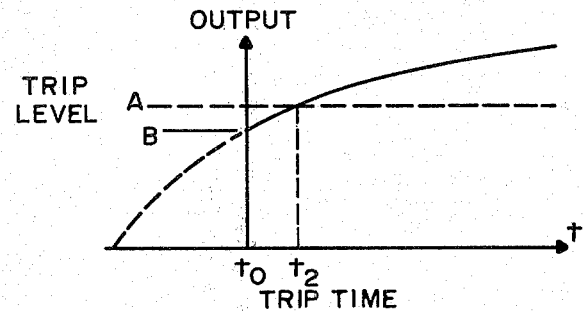
Figure 2C:
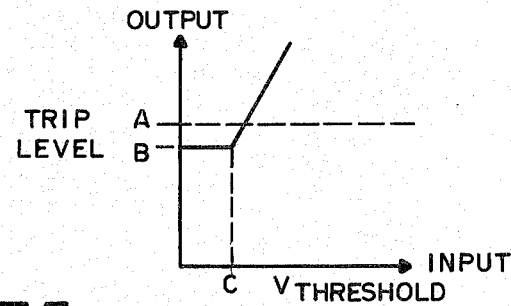

FIG. 2B illustrates the response of the circuit 10 to a large magnitude input signal having a frequency corresponding to the resonant frequency of the tuning element 16. Before the input signal commences at time $t_0$, the output at terminal 18 is held at a level B by the oscillator 13 providing a stable energizing signal which is passed through the tuning element 16. After the occurrence of the large magnitude input signal, the output rises along a curve similar to a capacitor charging curve and when the trip level A is reached a decode output signal is produced at terminal 23. This occurs at a time $t_2$ after the commencement of the input signal at $t_0$, the time $t_2$ being much less than the time $t_1$. Thus the decoder circuit 10 has a much faster response time than the prior art decoder systems.

Without negative feedback compensation, the amplitude of the oscillation signal produced by the oscillator 13 would normally be controlled by having one or more of the amplifiers 15, 17 and 19 driven into a limiting, saturation to cut-off mode of operation. If either of the amplifiers 15 or 17 were operated in a limiting mode, no change in the output signal at terminal 18 would be observed for a large magnitude input signal at terminal 12. In addition, if negative feedback were not used, the output signal magnitude would not be stable with temperature and even a small amplitude signal of the correct frequency might create a large change in the output amplitude.

The present invention, by providing negative feedback signal compensation, maintains the signal level at the terminal 18 at a stable constant magnitude level. This level is maintained until an input signal is received which has the proper frequency and a magnitude equal to the constant level divided by the gains of amplifiers 15 and 17 (assuming tuning element 16 to be lossless). For such an input signal the level detector 21 will effectively open circuit the attenuator 20 and thereby eliminate any positive signal feedback from terminal 18 to terminal 12. For any input signal greater than this minimum (threshold) value, the magnitude of the signal at terminal 18 will be directly increased. For input signals having magnitudes below this threshold level, the signal magnitude at the terminal 18 will be maintained at a constant level.

This relationship is graphically illustrated in FIG. 2C where the level B represents the constant magnitude level at the terminal 18, the level A represents the trip level which will cause the level detector 21 and the decode detector 22 to create a decode signal at the output terminal 23, and the input level C is the signal magnitude threshold level for the input terminal 12. The equations which are illustrated by FIG. 2C are:

$$V_{18} = B \text{ for } V_{12} \leq C \quad (1)$$

$$V_{18} = (V_{12})(A_{15})(A_{16})(A_{17}) \text{ for } V_{12} \geq C \quad (2)$$

$$C = \frac{B}{(A_{15})(A_{16})(A_{17})} \quad (3)$$

where $V_{18}$ is the signal magnitude at the terminal 18, $V_{12}$ is the signal magnitude at the input terminal 12, $A_{15}$, $A_{16}$, and $A_{17}$ represent the gains of the associated component blocks in FIG. 1, and C represents the input threshold voltage. In a preferred embodiment of the present invention B, the constant amplitude level maintained at the terminal 18, was selected to be two volts.

Thus the decoder circuit 10 produces a voltage level at the terminal 18 which exceeds the constant level B when the input signal at terminal 12 has a desired frequency and a magnitude above the threshold voltage C. The magnitude of the signal at terminal 18 is detected by the level detector 21 and subsequently compared to a reference level in order to produce a decode output signal at terminal 23 when the voltage at the terminal 18 exceeds the level B by a predetermined amount.

The response time of the decoder circuit 10 is drastically reduced since the oscillator 13 maintains stored energy in the tuning element 16. False response detection for the decoder circuit 10 remains high because for any input signal below the threshold voltage C, the level detector 21 and the attenuator 20 reduce the amount of positive signal feedback and thereby maintain the voltage at the terminal 18 at a constant level B. Input signals having frequencies other than the resonant frequency of the tuning element 16 result in no increase in the voltage at the terminal 18, since none of these signals are passed through the tuning element 16.

The amplifier 19 is operative between saturation and cut-off states when the voltage at the terminal 18 is held at the constant level B. Therefore when the voltage at terminal 18 is increased by a large decoding input signal being present at the terminal 12, no peak signal increase at the encode output terminal 24 is encountered. Thus the signal at terminal 24 is a constant amplitude signal with a frequency corresponding to the resonant frequency of the tuning element 16. This signal is always provided by the circuit 10 and is constantly available for encoding purposes.

FIG. 3 represents a practical embodiment of the encoder and decoder circuit 10 illustrated in FIG. 1. Corresponding parts which are common to FIGS. 3 and 1 have been given identical numbers.

The peak clipper circuit 14 (shown dashed) consists of a series connected capacitor 30 and resistor 31 connected between the decode input terminal 11 and an internal terminal 32. The terminal 32 is connected to the oscillator input terminal 12 through a capacitor 33 connected in series with a resistor 34. The internal terminal 32 is coupled to ground through a pair of oppositely oriented diodes 35. The components 30 through 35 comprise the peak clipper circuit 14 and the diodes 35 prevent any positive or negative input spike of greater than .7 volts from reaching the input terminal 12.

The amplifier 15 (shown dashed) receives its input from the terminal 12 and includes an NPN transistor 36 having its base connected to terminal 12. Base bias is supplied to the transistor 36 through resistors 37 and 38 which are connected between B+ and ground. The emitter of transistor 36 is connected to ground through a resistor 39 connected in parallel with a resistor 40 that is connected in series to a capacitor 41. The collector of the transistor 36 is connected to B+ through a load resistor 42 and to ground through a phase shift capacitor 42a. The amplifier 15 comprises elements 36 through 42.

The amplifier 15 is operated as a common emitter amplifier. The output of the amplifier 15 is obtained from the collector of the transistor 36 and is directly coupled to the frequency selective tuning element 16, which in FIG. 3 is represented as a high Q resonant reed.

The amplifier 17 (shown dashed) derives its input from the resonant reed 16 and basically comprises a pair of Darlington connected NPN transistors 43 and 44 operating as a common emitter amplifier stage. Base bias is supplied to the transistor 43 through resistors 45 and 46 connected between B+ and ground. A load resistor 47 is connected between B+ and the collectors of the transistors 43 and 44 and the emitter of transistor 44 is connected to ground through an emitter feedback resistor 48. Components 43 through 48 basically comprise the amplifier 17. The output of the amplifier 17 is obtained from the collectors of the transistors 43 and 44 and is directly coupled to the oscillator output terminal 18.

The amplifier 19 (shown dashed), which is run between saturation and cut-off and forms part of the positive feedback network between the output terminal 18 and the input terminal 12, basically comprises two common emitter amplifiers connected in cascade. An NPN transistor 49 receives an input signal at its base from the terminal 18 through a coupling capacitor 50 and has bias supplied to it through biasing resistors 51 and 52 connected between B+ and ground. The emitter of transistor 49 is connected to ground through a feedback resistor 53 and the collector of transistor 49 is connected to B+ through a load resistor 54 and to ground through a phase shift capacitor 54a. The capacitors 42a and 54a provide phase shift for the oscillation signal of the oscillator 13. The output of the transistor 49 is obtained from its collector and is coupled to the base of an NPN transistor 55 through a coupling capacitor 56. The base of transistor 55 receives bias from resistors 57 and 58 connected between B+ and ground. The emitter of transistor 55 is connected to ground through a resistor 59 which is AC bypassed by a capacitor 60, and the collector of transistor 55 is connected to B+ through a load resistor 61. The AC bypassing of the resistor 59 provides the transistor 55 with a large AC gain and insures that the transistor will be driven between saturation and cut-off. The collector of transistor 55, which corresponds to the output of the amplifier 19, is directly connected to the encoding output terminal 24 and is connected to the input terminal 20a of the attenuator 20 through a coupling capacitor 62. The components 50 through 62 comprise the amplifier 19.

The input terminal 20a of the attenuator 20 (shown dashed) is connected to an internal terminal 63 through a padding resistor 64. The output terminal 20b is connected directly to terminal 12 and connected to the internal terminal 63 through a padding resistor 65 connected in series with a DC blocking and AC coupling capacitor 66. The cathode of a diode 67 is directly connected to the terminal 63 and the anode of this diode is connected to B+ through a resistor 68. The anode of a diode 69 is directly connected to the terminal 63 and its cathode is connected to ground through a capacitor 70 and directly connected to the collector of an NPN transistor 71. The emitter of the transistor 71 is connected to ground through a resistor 72 and the base of transistor 71 is directly connected to the attenuator control terminal 20c.

The magnitude of the DC voltage present at the terminal 20c will control the collector current of the transistor 71. This collector current will in turn control the current through the diodes 67 and 69 and thereby create a controllable impedance to AC ground at the terminal 63 which can vary between infinity and the resistance of the parallel connection of the resistors 68 and 72. Thus attenuator 20 represents a variable controlled attenuator which includes the components 64 through 72.

The level detector 21 (shown dashed) receives and monitors the signal present at the terminal 18 and produces a control voltage coupled to the terminal 20c of the attenuator 20 and a level indicating signal coupled to the decode detector 22. The level detector 21 basically comprises a resistive isolation and amplification stage followed by a rectifier stage which produces a DC signal which is related to the peak magnitude of the AC signal present at the terminal 18.

The terminal 18 is coupled through a coupling capacitor 73 to the base of an NPN transistor 74 which is operated as a common emitter amplifier. The base of transistor 74 receives DC bias from resistors 75 and 76 which are connected between B+ and ground. Transistor 74 has its emitter connected to ground through a resistor 77 and its collector connected to B+ through a load resistor 78. The collector of transistor 74 is coupled through a coupling capacitor 79 to the base of an NPN transistor 80 which has its collector connected to B+ and its emitter connected to ground through a capacitor 81 connected in parallel with a resistor 82. The base of the transistor 80 is connected to ground through a resistor 83 connected in parallel with a diode 84 which has its anode connected directly to ground.

Components 79 through 84 form a voltage doubler circuit for detecting the signal level at the collector of transistor 74. The transistor 80 is used in place of a conventional second diode to reduce signal loading and the components 83 and 84 supply base bias to the transistor 80 which produces a DC level indicating signal at its emitter. This level signal is coupled to the control terminal 20c through a resistor 85 and to the decode detector 22 through a resistor 86. The components 74 through 86 comprise the level detector 21 which develops a level indicating voltage at the emitter of transistor 80 that controls the variable attenuator 20 and serves as an input to the decode detector 22.

For a slight increase in the signal magnitude at the terminal 18, the DC voltage present at the emitter of transistor 80 will increase. This results in a voltage increase at the terminal 20c which in turn causes the transistor 71 to draw more current through the diodes 67 and 69. The additional current results in the diodes having a lower resistance and this results in an increase in the attenuation between terminals 20a and 20b. Therefore, for a slight increase in the signal level at terminal 18, the amount of positive feedback supplied by the attenuator 20 to the terminal 12 will be decreased. Since the terminal 12 is an input terminal to the oscillator, the net effect of this reduction in positive feedback will be to maintain the amplitude of the signal present at the terminal 18 at a constant level. This effect will continue until a further slight increase in the signal level at the terminal 18 can no longer substantially decrease the amount of positive feedback. At this point the level detector 21 and the attenuator 20 will be unable to compensate for any further increases in the signal level at the terminal 12 due to an input signal at the terminal 11 which has a frequency corresponding to the resonant frequency of the tuning element 16. Therefore, any further increase in the signal at terminal 11 will cause the amplitude of the signal at the terminal 18 to substantially increase.

The decode detector 22 (shown dashed) receives at its input terminal 87 a level indicating signal from the emitter of the transistor 80. The terminal 87 is directly connected to the emitter of a PNP transistor 88 which has its collector connected to ground and its base connected to the base of an NPN transistor 89. The collector of transistor 89 is connected to B+ and its emitter is directly connected to the emitter of an NPN transistor 90 and is connected to ground through a resistor 91. The transistor 90 has its collector connected to B+ through a load resistor 92 and its base connected to ground through a capacitor 93 and connected to the terminal 87 through a resistor 94 connected in parallel with a diode 95. The cathode of the diode 95 is directly connected to the terminal 87. A PNP transistor 96 has its base connected to the collector of transistor 90 through a resistor 97, its emitter connected directly to B+, and its collector connected to the base of an NPN transistor 98 through a resistor 99. The transistor 98 has its base connected to ground through a resistor 100 and its emitter directly connected to ground. The transistor 98 has its collector connected to B+ through a resistor 101, connected to the base of transistor 96 through a capacitor 102 in series with a resistor 103, and connected directly to the decode output terminal 23. The components 87 through 103 basically comprise the decode detector 22.

The base of the transistor 89 is connected to B+ through a resistor 104 and connected to the base of an NPN transistor 105 through a resistor 106. The transistor 105 has its collector directly connected to B+, its base connected to ground through a resistor 107, and its emitter connected to the emitter of transistor 71. Resistors 104, 106 and 107 form a voltage divider network which provides an initial reference bias to the base of the transistor 89. This bias insures that the transistor 89 will normally be turned on and transistor 90 will normally be turned off. Transistor 105 forms a differential amplifier set switch with transistor 71 which determines the turn on voltage for transistor 71.

When the amplitude level of the signal at terminal 18 increases substantially, the DC level at the emitter of the transistor 80 will increase and this will result in an increase in the voltage at the terminal 87. When this voltage reaches 0.7 volts above the base voltage of transistor 89, transistor 88 will turn on and clamp the voltage at terminal 87. This provides a constant charging voltage, and therefore a constant charge time, for the capacitor 93 through the resistor 94. This will eventually cause the base of the transistor 90 to have a voltage greater than the base of the transistor 89. Therefore, the transistor 90 will subsequently be turned on and the transistor 89 turned off.

The collector of the transistor 90 will fall to a low voltage when the transistor 90 is turned on and this in turn turns on the transistor 96 which turns on the transistor 98 and thereby creates a low voltage at the decode output terminal 23. This low voltage at the terminal 23 indicates that an input signal having a desired frequency has been received at the terminal 11 and that the magnitude of this input signal is large enough to cause an increase in the signal level at the terminal 18.

The resistors 104, 106 and 107 provide a reference level voltage to the base of the transistor 89 so that any DC voltage at the terminal 87 which is below this reference voltage will not result in a decode signal. For voltages at the terminal 87 which exceed this reference level voltage by more than 0.7 volts, the resistor 94 and the capacitor 93 provide an integrating network which causes a time delay so that only a sufficiently high DC level which exists for at least a minimum duration of time will result in the turning on of the transistor 90 and the turning off of the transistor 89. This time delay network provides additional falsing protection since only signals having at least a minimum magnitude, a proper frequency, and which exist for at least a predetermined minimum amount of time will be identified as a proper code signal. Thus a short high energy tone burst will not cause the decode circuit 10 to falsely respond since the resistor 94 and the capacitor 93 provide a time delay and the level detector 21 and the attenuator 20 provide negative feedback compensation which returns the signal level at the terminal 18 to its previous constant amplitude level after the high energy burst. The negative feedback also instantly reduces the magnitude of the voltage rise at the terminal 18 in response to a short burst of energy. This aids in reducing any possible ringing of the resonant reed after the energy pulse.

The diode 95 permits the rapid discharge of the capacitor 93 when the voltage level at the terminal 87 drops to .7 volts below the voltage on the capacitor 93. Thus the decode detector 22 is reset every time the voltage at the terminal 18 is reduced to its constant magnitude level B after a large input signal.

The present invention is not limited to a decoder having negative feedback compensation circuitry which reduces the amount of positive feedback in a closed loop oscillator. The negative feedback may be used to control any variable gain (attenuation) element in the oscillator loop to maintain a constant amplitude level at a point in the loop throughout a range of input signal levels. Additionally, while the preferred embodiment shows amplifers 15 and 17 connected in cascade between input terminal 12 and output terminal 18, the present invention will perform satisfactorily if all of the amplification is provided by circuitry in the positive feedback path between terminal 18 and terminal 12. The frequency selective element must still be coupled between the input terminal 12 and output terminal 18 to prevent the signal level at the terminal 18 from being increased by an input signal having a frequency which does not substantially correspond to the desired decoding frequency.

While I have shown and described specific embodiments of this invention, further modifications and improvements will occur to those skilled in the art. All such modifications which retain the basic underlying principles disclosed and claimed herein are within the scope of this invention.

I claim:

1. An improved combination encoder/decoder circuit arrangement for providing encoder output signals of a predetermined frequency while simultaneously detecting external input signals having the predetermined frequency and magnitudes above a predetermined value, said circuit arrangement comprising in combination:
   a closed loop oscillator having an input terminal, an output terminal, a frequency selective device coupled therebetween, and positive feedback means coupled between said output terminal and said input terminal for enabling said oscillator to generate signals of a predetermined frequency;
   negative feedback compensation means coupled to said oscillator for maintaining a substantially constant signal level at said oscillator output terminal for external signals applied to said input terminal having said predetermined frequency and magnitudes below predetermined value and for permitting an increase in the signal level at said oscillator output terminal for external signals having said predetermined frequency and magnitudes above said predetermined value; and
   decoder means coupled to said oscillator output terminal and having a decode output terminal for producing decode signals at said decode output terminal in response to the signal level at said oscillator ouput terminal exceeding said constant level by a predetermined amount;
   whereby a signal adaptable for encoding purposes is constantly provided at said oscillator output terminal while decode signals are simultaneously provided at said decode output terminal for external signals applied to said input terminal which have magnitudes above said predetermined value.

2. An improved combined encoder/decoder circuit according to claim 1 wherein said oscillator includes a variable gain means which is controlled by said negative feedback means and coupled between said input and output terminals for providing said oscillator with a controllable signal gain.

3. An improved combined encoder/decoder circuit according to claim 2 wherein said negative feedback means includes a level detector means coupled to said oscillator output terminal for detecting the signal magnitude at said output terminal and inversely varying the gain of said gain means over a predetermined range of gains in response thereto.

4. An improved combined encoder/decoder circuit according to claim 3 wherein said variable gain means includes a variable attenuator coupled between said input and output terminals.

5. An improved combined encoder/detector circuit according to claim 4 wherein said oscillator includes a limiting constant maximum amplitude output stage coupled between said output terminal and said variable attenuator.

6. An improved combined encoder/decoder circuit according to claim 1 which includes a limiting amplifier circuit means coupled to said output terminal for providing a constant maximum amplitude encoding output signal.

7. An improved combined encoder/decoder circuit according to claim 1 wherein said decoder means includes falsing protection means for producing a decode signal only if the magnitude of the output signal exceeds said constant level for a predetermined duration of time.

8. An improved combined encoder/decoder circuit according to claim 7 wherein said falsing protection means includes a resistive and capacitive integrating network which determines said predetermined duration of time.

9. An improved combined encoder/decoder circuit for constantly providing an encoder output signal having a predetermined frequency and detecting input signals having the predetermined frequency and magnitudes above a predetermined value, the circuit comprising:
closed loop oscillator means, including an input terminal adaptable for receiving said input signals, an output terminal, and a frequency selective means, said oscillator means producing an oscillation signal having said predetermined frequency by using positive signal feedback from said output terminal to said input terminal, said frequency selective means being coupled between said input and output terminals for passing, from said input to said output terminal, only signals having frequencies which substantially correspond to said predetermined frequency;
negative feedback compensation means coupled to said oscillator means for monitoring and maintaining a substantially constant magnitude signal level at said output terminal for input signals received by said input terminal which have said predetermined frequency and magnitudes below said predetermined value, and for allowing said oscillator means to substantially increase the magnitude of the signal at said output terminal above said constant magnitude level in response to input signals received by said input terminal which have said predetermined frequency and magnitudes above said predetermined value; and
decode detection means coupled to said output terminal for producing a decode signal in response to the signal magnitude at said output terminal exceeding said constant magnitude level by a predetermined amount;
whereby decode signals are provided by said detection means while a signal adaptable for encoding purposes is constantly provided at said output terminal.

10. An improved decoder circuit adaptable for combined encoder/decoder applications for detecting an input signal having a predetermined frequency and a magnitude above a predetermined value, the decoder circuit comprising:
closed loop oscillator means, including an input terminal adaptable for receiving said input signal, an output terminal, and a frequency selective means, said oscillator means producing an oscillation signal having said predetermined frequency by using positive signal feedback from said output terminal to said input terminal, said frequency selective means being coupled between said input and output terminals for passing, from said input to said output terminal, only signals having frequencies which substantially correspond to said predetermined frequency;
negative feedback compensation means coupled to said oscillator means for monitoring and maintaining a substantially constant magnitude signal level at said output terminal for input signals received by said input terminal which have said predetermined frequency and magnitudes below said predetermined value, and for allowing the magnitude of the signal at said output terminal to substantially increase above said constant magnitude level in response to input signals received by said input terminal which have said predetermined frequency and magnitudes above said predetermined value; and
decode detection means coupled to said output terminal for producing a decode signal in response to the signal magnitude at said output terminal exceeding said constant magnitude level by a predetermined amount;
whereby said oscillator means keeps said frequency selective means excited by said oscillation signal to provide a decoder with a fast response to a proper input signal while said negative feedback means prevents the decoder from responding unless the input signal has a magnitude above said predetermined value.

11. An improved decoder circuit adaptable for combined encoder/decoder applications for detecting the presence of an input signal having a predetermined frequency and a magnitude above a pedetermined value, the decoder circuit comprising:
closed loop oscillator means, including an input terminal adaptable for receiving said input signal, an output terminal, frequency selective means, and positive feedback circuitry, said oscillator means producing an oscillation signal having said predetermined frequency by using said feedback circuitry to provide positive signal feedback from said output terminal to said input terminal, said frequency selective means coupled between said input and output terminals for passing, from said input to said output terminal, only signals having frequencies which substantially correspond to said predetermined frequency;
negative feedback compensation means coupled to said oscillator means and operative for varying the amount positive signal feedback of said oscillator means for maintaining a substantially constant magnitude signal level at said output terminal for input signals received by said input terminal which have said predetermined frequency and magnitudes below said predetermined value, and for allowing the magnitude of the signal at said output terminal to increase above said constant magnitude level in response to input signals received by said input terminal which have said predetermined frequency and magnitudes above said predetermined value; and decoder detection means coupled to said output terminal for producing a decode signal in response to the signal magnitude at said output terminal exceeding said constant magnitude level by a predetermined amount;

whereby said oscillator means keeps said frequency selective means excited by said oscillation signal to provide a decoder with a fast response to a proper input signal while said negative feedback means prevents the decoder from responding unless the input signal has a magnitude above said predetermined value.

* * * * *